(12) United States Patent
Wallace

(10) Patent No.: US 8,733,792 B2
(45) Date of Patent: May 27, 2014

(54) CASTOR WHEEL

(75) Inventor: Des Wallace, Brisbane (AU)

(73) Assignee: Noah No. 1 Pty Ltd, Chermside, QLD (AU)

( * ) Notice: Subject to any disclaimer, the term of this patent is extended or adjusted under 35 U.S.C. 154(b) by 586 days.

(21) Appl. No.: 12/918,793

(22) PCT Filed: Feb. 20, 2009

(86) PCT No.: PCT/AU2009/000193
§ 371 (c)(1),
(2), (4) Date: Nov. 9, 2010

(87) PCT Pub. No.: WO2009/103121
PCT Pub. Date: Aug. 27, 2009

(65) Prior Publication Data
US 2011/0187080 A1  Aug. 4, 2011

(30) Foreign Application Priority Data
Feb. 21, 2008  (AU) ................................ 2008900827

(51) Int. Cl.
*B60R 9/06*  (2006.01)
(52) U.S. Cl.
USPC ........... 280/767; 280/769; 280/762; 280/656; 280/35
(58) Field of Classification Search
USPC .............. 280/760, 762, 763.1, 767, 769, 727, 280/638, 35, 651, 656, 79.11, 79.2; 16/35 D, 18 R, 35 R
See application file for complete search history.

(56) References Cited

U.S. PATENT DOCUMENTS

| | | | | |
|---|---|---|---|---|
| 1,592,944 A | * | 7/1926 | Jones | 248/129 |
| 2,114,586 A | * | 4/1938 | Bowen | 280/47.371 |
| 2,583,858 A | * | 1/1952 | Kostolecki | 16/35 R |
| 3,751,758 A | | 8/1973 | Higbee et al. | 16/35 |
| 3,877,714 A | * | 4/1975 | Black | 280/638 |
| 3,890,668 A | * | 6/1975 | Stosberg et al. | 16/35 R |
| 3,944,259 A | * | 3/1976 | Miller | 280/475 |
| 4,054,965 A | * | 10/1977 | Vig et al. | 16/35 D |
| 4,593,840 A | * | 6/1986 | Chown | 224/520 |
| 4,645,230 A | * | 2/1987 | Hammons | 280/656 |
| 4,744,590 A | * | 5/1988 | Chesney | 280/769 |
| 5,018,651 A | * | 5/1991 | Hull et al. | 224/502 |
| 5,199,842 A | * | 4/1993 | Watt et al. | 414/537 |
| 5,221,100 A | * | 6/1993 | McNutt | 280/78 |
| 5,397,148 A | * | 3/1995 | Nelson | 280/416.1 |
| 5,678,984 A | * | 10/1997 | Petersen | 414/537 |
| 5,711,539 A | * | 1/1998 | Tang | 280/11.27 |

(Continued)

FOREIGN PATENT DOCUMENTS

| | | |
|---|---|---|
| GB | 2127755 | 4/1983 |
| JP | 5254307 | 10/1993 |
| WO | 94/10000 | 5/1994 |

*Primary Examiner* — J. Allen Shriver, II
*Assistant Examiner* — Travis Coolman
(74) *Attorney, Agent, or Firm* — K&L Gates LLP

(57) ABSTRACT

A castor wheel for a vehicle or an attachment for a vehicle, the castor wheel comprising; a wheel having an axle about which the wheel can rotate, an offset pivot mounting for mounting the castor wheel to the vehicle or vehicle attachment, the pivot mounting being connected to the wheel axle and defining a pivot axis perpendicular to and offset from the wheel axle, the wheel capable of pivoting about the pivot axis, and wherein the castor wheel also comprises a restrainer for restraining the pivoting of the wheel is disclosed.

16 Claims, 12 Drawing Sheets

(56) References Cited

U.S. PATENT DOCUMENTS

| | | | |
|---|---|---|---|
| 5,762,155 A * | 6/1998 | Scheulderman | 180/65.1 |
| 5,769,449 A * | 6/1998 | Keesee | 280/656 |
| 5,984,333 A * | 11/1999 | Constantijn et al. | 280/250.1 |
| 6,386,819 B1 * | 5/2002 | Schultz | 414/537 |
| 6,659,491 B2 * | 12/2003 | Green | 280/423.1 |
| 6,830,423 B1 * | 12/2004 | Williams et al. | 414/462 |
| 7,210,690 B2 * | 5/2007 | Tan | 280/47.38 |
| 7,258,353 B2 * | 8/2007 | Liao | 280/47.38 |
| 8,490,242 B2 * | 7/2013 | Cooper et al. | 16/35 R |
| 2002/0105162 A1 * | 8/2002 | Green | 280/477 |
| 2004/0104548 A1 * | 6/2004 | Tang | 280/11.19 |
| 2006/0175799 A1 * | 8/2006 | Heynssens | 280/414.5 |
| 2007/0059140 A1 * | 3/2007 | Kiser | 414/545 |
| 2007/0241153 A1 * | 10/2007 | Medina et al. | 224/497 |
| 2008/0184500 A1 * | 8/2008 | Bettcher | 14/71.1 |
| 2009/0309330 A1 * | 12/2009 | Ryan | 280/462 |
| 2011/0316244 A1 * | 12/2011 | Tang | 280/11.27 |

* cited by examiner

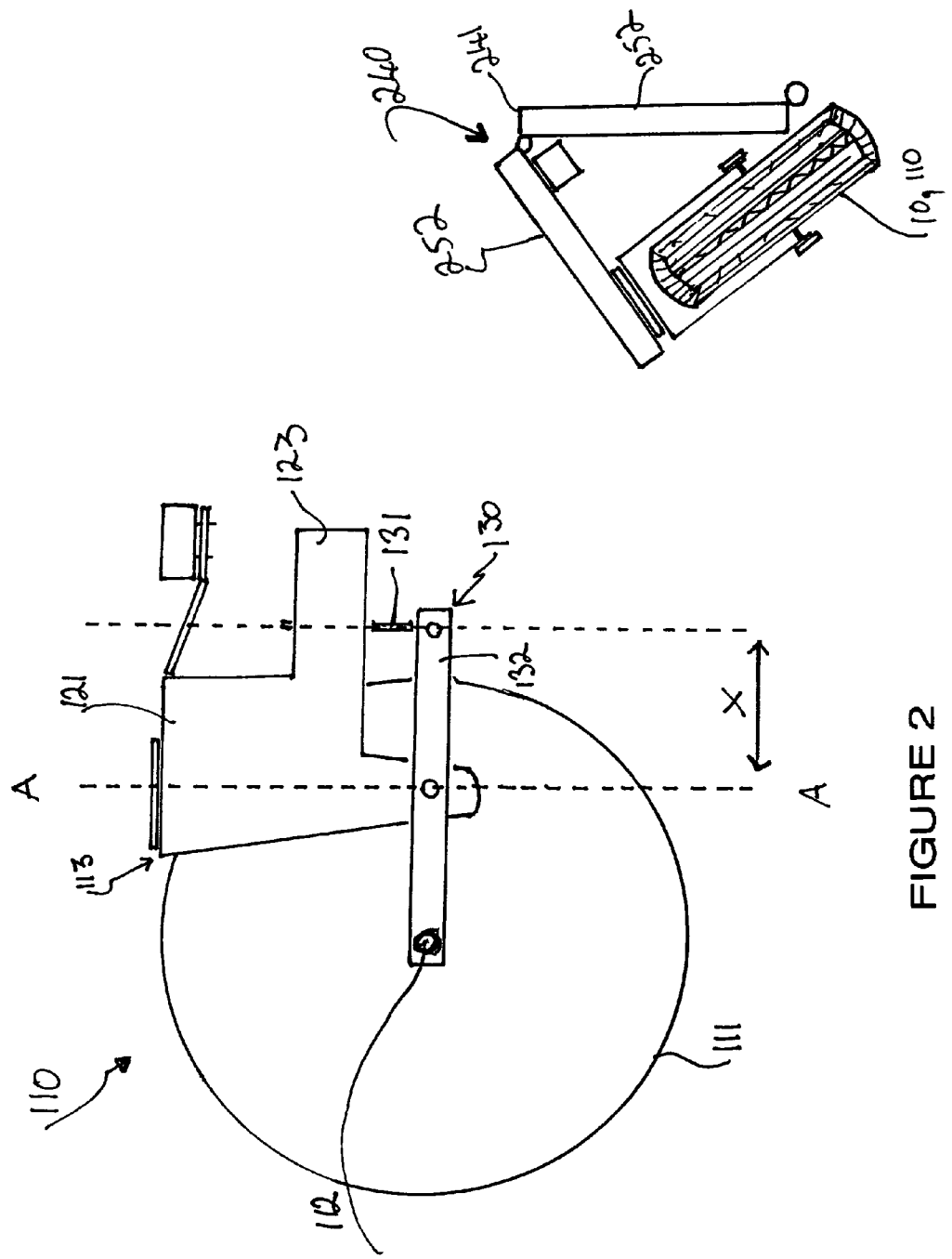

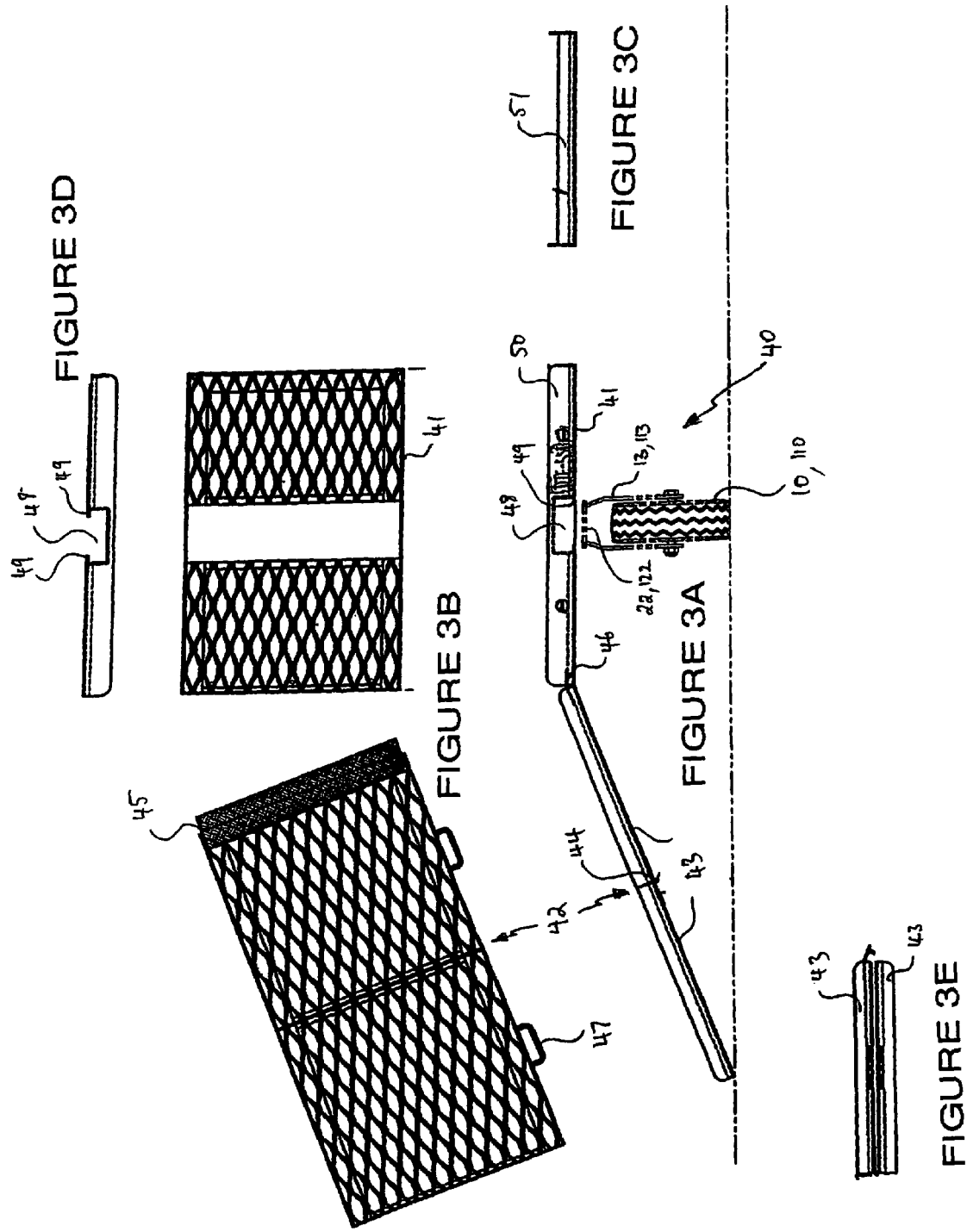

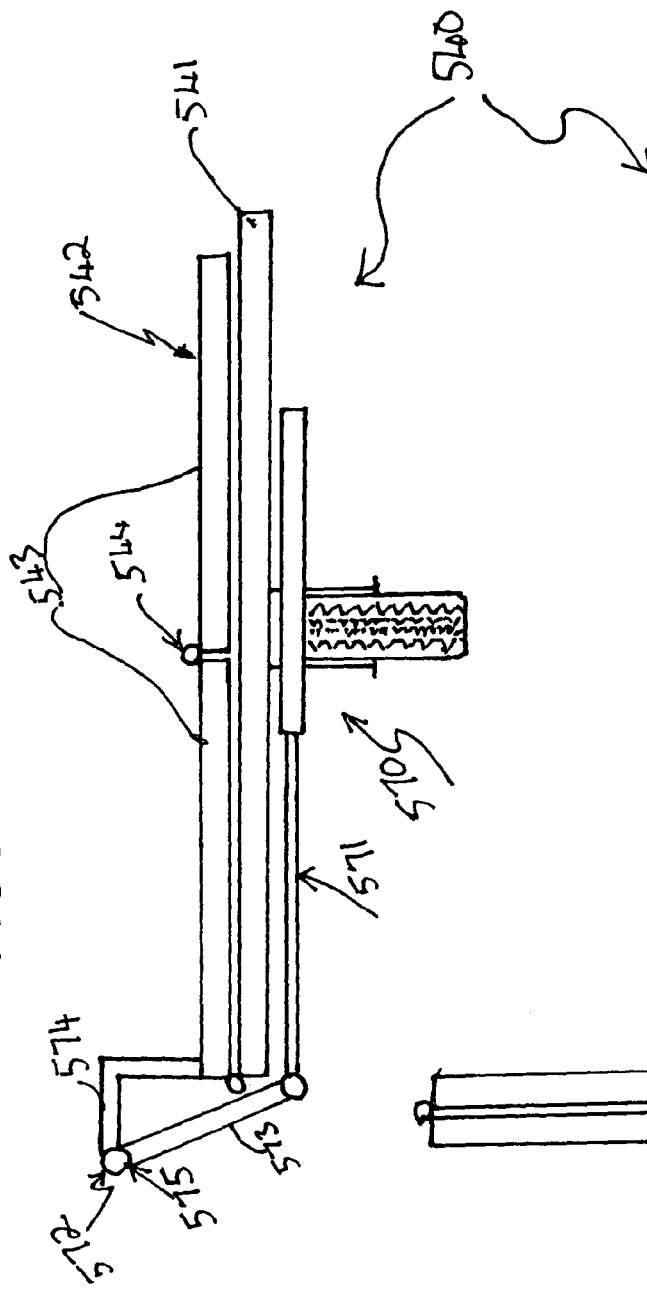

CASTOR WHEEL

CROSS-REFERENCES TO RELATED APPLICATIONS

This application is a National Stage Entry of PCT/AU2009/000193 filed on Feb. 20, 2009, which claims priority to Australian Application Serial Number 2008900827, filed on Feb. 21, 2008, both of which applications are incorporated by reference in their entirety herein.

FIELD OF THE DISCLOSURE

The present disclosure relates to a castor wheel, in particular to a castor wheel for a vehicle or an attachment for a vehicle.

BACKGROUND OF THE DISCLOSURE

A castor wheel is a type of wheel having a pivot mounting which is offset from the wheel axle. This causes the wheel to pivot about the pivot mounting to align itself generally with the direction from which the castor wheel is pushed. Common applications of castor wheels are on office chairs and shopping trolleys. Notably, both of these applications involve use of the castor wheel at low speeds (less than 10 km/hr). Significant problems exist with using castor wheels at higher speeds because vibrations occur in the alignment of the wheel relative to the direction in which the wheel is travelling. This problem causes a reduction in the efficiency of the movement of a vehicle or apparatus having the castor wheels, thus limiting the maximum speed at which the vehicle or apparatus may travel. Furthermore, this vibration problem provides great difficulty in controlling the alignment of the castor wheels and hence the direction in which the vehicle or apparatus is travelling.

SUMMARY OF THE DISCLOSURE

According to a first aspect of the present disclosure, there is provided a castor wheel for a vehicle or an attachment for a vehicle, the castor wheel comprising; a wheel having an axle about which the wheel can rotate, an offset pivot mounting for mounting the castor wheel to the vehicle or vehicle attachment, the pivot mounting being connected to the wheel axle and defining a pivot axis perpendicular to and offset from the wheel axle, the wheel capable of pivoting about the pivot axis, and wherein the castor wheel also comprises a restrainer for restraining the pivoting of the wheel.

The vehicle is capable of travelling at a speed in excess of 10 km/hr, preferably in excess of 20 km/hr, more preferably in excess of 40 km/hr, more preferably in excess of 60 km/hr, more preferably up to 100 km/hr, even more preferably in excess of 100 km/hr.

The restrainer may be offset from (i.e. is out of alignment with) the pivot axis.

The distance between the restrainer and the pivot axis may be 5-40 cm, preferably 8-25 cm, more preferably 10-20 cm, even more preferably approximately 15 cm.

The pivot mounting may comprise a bearing to enable the pivoting of the wheel. The pivot axis is defined by the bearing.

The pivot mounting may comprise mounting arms on either side of the wheel, the mounting arms being connected to the wheel axle.

The pivot mounting may comprise a chassis. The chassis may be in the form of a rail.

The mounting arms may connect the bearing to the wheel axle.

The pivot mounting may comprise a mounting plate connecting the bearing to the chassis.

In another arrangement, the pivot mounting may comprise a mounting plate for connecting the bearing to the vehicle or attachment for a vehicle.

The mounting plate may be located on the other side of the bearing to the mounting arms.

The restrainer may comprise a first element and a second element wherein the first and second elements interact to produce a restraining force on the pivoting of the wheel.

The first element may be connected to the pivot mounting.

The second element may be connected to the vehicle or vehicle attachment.

In another arrangement, the second element may be connected to the pivot mounting.

The first element may comprise a contact plate and the second element may comprise an electromagnet.

In another arrangement the second element may be permanent magnet.

In another arrangement the second element may be a brake caliper.

In another arrangement the second element may be a hydraulic brake.

In another arrangement the second element may be a compressed air brake.

The electromagnet may be mounted on the chassis of the pivot mounting.

The chassis may have a recess for receiving therein a portion of the electromagnet.

The recess may be formed on the underside of the chassis.

The recess may be formed by a ring.

The recess may have the same inner cross-sectional shape as the cross-sectional shape of the electromagnet.

The electromagnet may extend from the chassis, preferably from the underside of the chassis.

The restrainer may comprise an adjustor for adjusting the extent to which the electromagnet extends from the chassis.

The adjustor may comprise a screw, threaded bolt or the like which may be received in the electromagnet through the chassis, preferably from the opposing side of the chassis from which the electromagnet extends.

The electromagnet is arranged relative to the contact plate so that, in use, it may impart an attractive force on the contact plate towards the electromagnet.

The contact plate may be formed of a material which will be effected by a magnetic field.

The electromagnet may have a breakaway capacity of 20-100 kg, preferably, 30-90 kg, more preferably 30-70 kg, more preferably 30-40 kg, even more preferably approximately 34 kg.

The restrainer may comprise a spacer for spacing apart the first and second elements.

The spacer may be provided between the first and second elements.

The spacer may comprise a thin fibre shim provided between the contact plate and the electromagnet.

In another arrangement, the spacer may comprise a projection projecting from the second element.

The projection may be attached to the second element.

The spacer may comprise a ring, attachable to the electromagnet and projecting there from towards the contact plate.

The ring may be formed of aluminium or aluminium alloy.

In another arrangement, the ring may be formed of a polymer.

The restrainer may comprise at least one connecting member which connects the contact plate to the pivot mounting, preferably to the mounting arms of the pivot mounting.

Generally, the contact plate is wider than the width of the electromagnet.

The contact plate may comprise a circular ring, extending around the pivot mounting. This embodiment allows for 360° pivoting of the wheel.

In this embodiment, the restrainer may comprise a number of connecting members to connect the contact plate to the pivot mounting.

The contact plate may comprise only a portion of a ring.

The contact plate may have side edges which are turned and/or tapered away from the electromagnet.

The contact plate may be biased vertically away from the electromagnet.

The contact plate bias may be provided by spring loaded bolts connecting the contact plate to the connecting member.

The power source for the electromagnet may be provided by a battery.

The power source for the electromagnet may be provided by the vehicle or vehicle attachment.

The electromagnet may be switched on and off.

Control of switching the electromagnet on and off may be provided manually.

The switching on and off of the electromagnet may be provided by a remote control.

Control of switching the electromagnet on and off may be provided automatically.

The restrainer may also comprise a sensor for sensing the speed of the vehicle or vehicle attachment, whereby the electromagnet is switched off when the sensor detects that the vehicle or vehicle attachment is travelling at a certain low speed.

The castor wheel may also comprise a wheel suspension apparatus for providing vertical suspension of the wheel.

The suspension apparatus may comprise at least one, preferably two, spring(s) and two suspension members, located on either side of the wheel.

Each of the two suspension members are connected towards one end to the wheel axle and towards the other end to the spring(s).

The pivot mounting may be connected to mid-points of respective suspension members.

The spring(s) may be connected to the pivot mounting.

According to a second aspect of the present disclosure, there is provided a wheelchair trailer for carrying a wheelchair, the wheelchair trailer comprising a base for carrying the wheelchair, a ramp for getting the wheelchair on and off the base, and at least one castor wheel.

The at least one castor wheel may be a castor wheel according to the first aspect of the present disclosure.

The base may be preferably formed from a metal mesh or screen. However, it may be formed from any other suitable material which provides a surface on which the wheelchair can be supported.

Similarly, the ramp may be formed from a metal mesh or screen. However, it may be formed from any other suitable material, such as a plastic material (for example polyurethane), which provides a surface on which the wheelchair can be supported.

The ramp may comprise at least two ramp portions.

The ramp portions may be joined together by a joining hinge which enables the ramp portions to be moved between an extended position and a folded position.

The joining hinge may be a single sided hinge.

The joining hinge may be arranged so that when a wheelchair is on the ramp, the ramp portions cannot undesirably collapse towards the folded position.

The ramp may have a base connecting hinge at the end of the ramp which connects to the base. The base connecting hinge generally enables the ramp to be moved between an upright position and a lowered position.

The base connecting hinge may also provide a surface across the join between the base and the ramp.

The base connecting hinge may be temporarily connected to the base.

The base connecting hinge may be permanently connected to the base.

The base connecting hinge may have spigots projecting from one side of the hinge for engaging the base.

The spigots engage the base by insertion through the mesh.

The spigots and hence the ramp may be readily moved into and out of engagement with the base.

The ramp may also comprise at least one handle for facilitating ease of handling of the ramp.

The ramp comprises at least one handle on each of the ramp portions.

The wheelchair trailer may also comprise an actuator for moving the ramp, preferably between an upright position and a lower position.

The actuator may comprise a piston rod, which is driven by a hydraulic, electric, pneumatic or magnetic motor, preferably a magnetic motor.

The actuator may have a thrust of up to 4000 N, preferably up to 6000 N, more preferably up to 8000 N.

The piston rod may have a maximum speed of no more than 70 mm/s, preferably no more than 60 mm/s, more preferably approximately 52 mm/s.

The actuator may be positioned under the base.

The actuator may be mounted to the base.

The actuator may be connected to the ramp by an arm.

The arm of the actuator is rotatably connected to the piston rod.

The arm may comprise first and second portions, which may be rotatably connected to one another.

The first arm portion may be substantially linear and is preferably connected to the piston rod.

The second arm portion may be bent and is preferably connected to the ramp.

The base of the wheelchair trailer may comprise a channel for connecting the at least one castor wheel to the wheelchair trailer.

The channel may have internal flanges.

The internal flanges may or may not extend the length of the channel.

The castor wheel may be connected to the base by positioning the mounting plate of the pivot mounting in the channel and connecting the mounting plate to the flanges.

The base of the wheelchair trailer may be provided with end walls and a side wall for aiding in retaining a wheelchair on the trailer.

The wheelchair trailer may also comprise a connecting mechanism for connecting the trailer to the towbar of a vehicle.

The connecting mechanism may prevent pivoting of the trailer with respect to the vehicle in the horizontal plane.

The connecting mechanism may comprise a draw bar which connects directly to the towbar and a hinge for allowing vertical rotation of the wheelchair trailer with respect to the vehicle.

The hinge of the connecting mechanism may comprise a pin and pipes located on the drawbar and base of the wheelchair trailer, the pin capable of being inserted and fixed through the pipes.

The base may comprise two base portions, joined together by a single sided hinge to enable the base to be folded into a storage position when the wheelchair trailer is not carrying a wheelchair.

The wheelchair trailer may also comprise a winch for moving the base into and out of the storage position.

The at least one castor wheel may be connected to the base portion furthest from the vehicle.

The at least one castor wheel may abut the other base portion when the base is in the storage position. This may enable the base to support itself in the storage position.

The wheelchair trailer may also comprise a mounting member to which the at least one castor wheel is mounted on one side and the base of the trailer is mounted on the opposing side.

The base portions of the base may be in the form of skids.

The skids may be of a width slightly greater than the width of the wheels of a wheelchair, for receiving the wheels on either side of the wheelchair respectively.

The distance between each of the skids may be adjusted in order to accommodate different wheelchairs on the wheelchair trailer.

Adjustment of the distance between the skids may be achieved by sliding one or both them along the mounting member.

According to a third aspect of the present disclosure, there is provided a vehicle comprising at least one castor wheel according to the first aspect of the present disclosure.

The vehicle is capable of travelling at a speed in excess of 10 km/hr, preferably in excess of 20 km/hr, more preferably in excess of 40 km/hr, more preferably in excess of 60 km/hr, more preferably up to 100 km/hr, even more preferably in excess of 100 km/hr.

According to a fourth aspect of the present disclosure, there is provided an attachment for a vehicle comprising at least one castor wheel according to the first aspect of the present disclosure.

The attachment may comprise a motorbike trailer or a wheelchair trailer or a scooter trailer for example.

BRIEF DESCRIPTION OF THE DRAWINGS

Preferred embodiments of the present disclosure will now be described, by way of example only, with reference to the accompanying drawings, in which:

FIG. 2 is a side view of a castor wheel according to another embodiment of the present disclosure;

FIG. 3A is an end view of a wheelchair trailer according to an embodiment of the present disclosure;

FIG. 3B is an exploded top view of the wheelchair trailer of FIG. 3A;

FIG. 3C is a side view of a base of the wheelchair trailer of FIG. 3A;

FIG. 3D is an upside down end view of the wheelchair trailer base of FIG. 3C;

FIG. 3E is a side view of a ramp of the wheelchair trailer of FIG. 3A in a folded position;

FIG. 7B is a side view of the wheelchair trailer of FIG. 7A;

FIGS. 10A to 10D are end views of a wheelchair trailer according to another embodiment of the present disclosure, showing sequential movement of the ramp of the trailer from FIG. 10A through to FIG. 10D.

DETAILED DESCRIPTION OF THE DISCLOSURE

Figure 1:
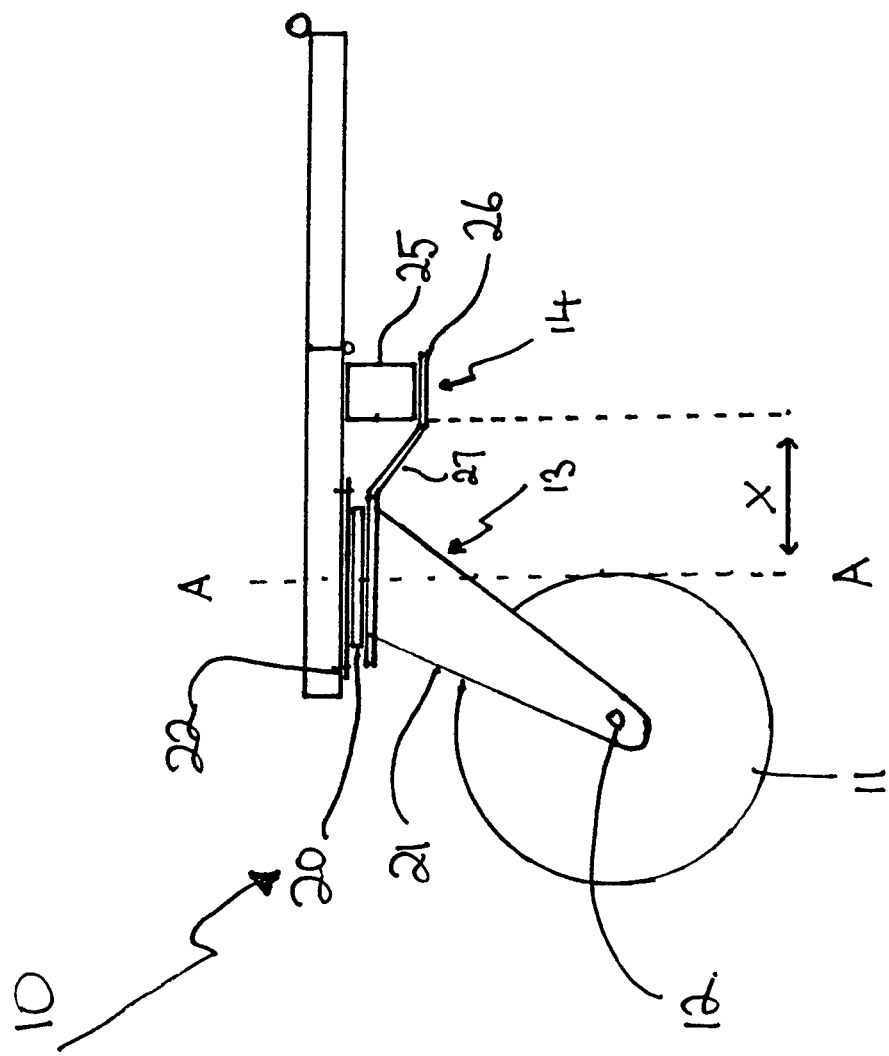
FIG. 1 is a side view of a castor wheel according to an embodiment of the present disclosure.
Figure 1A:
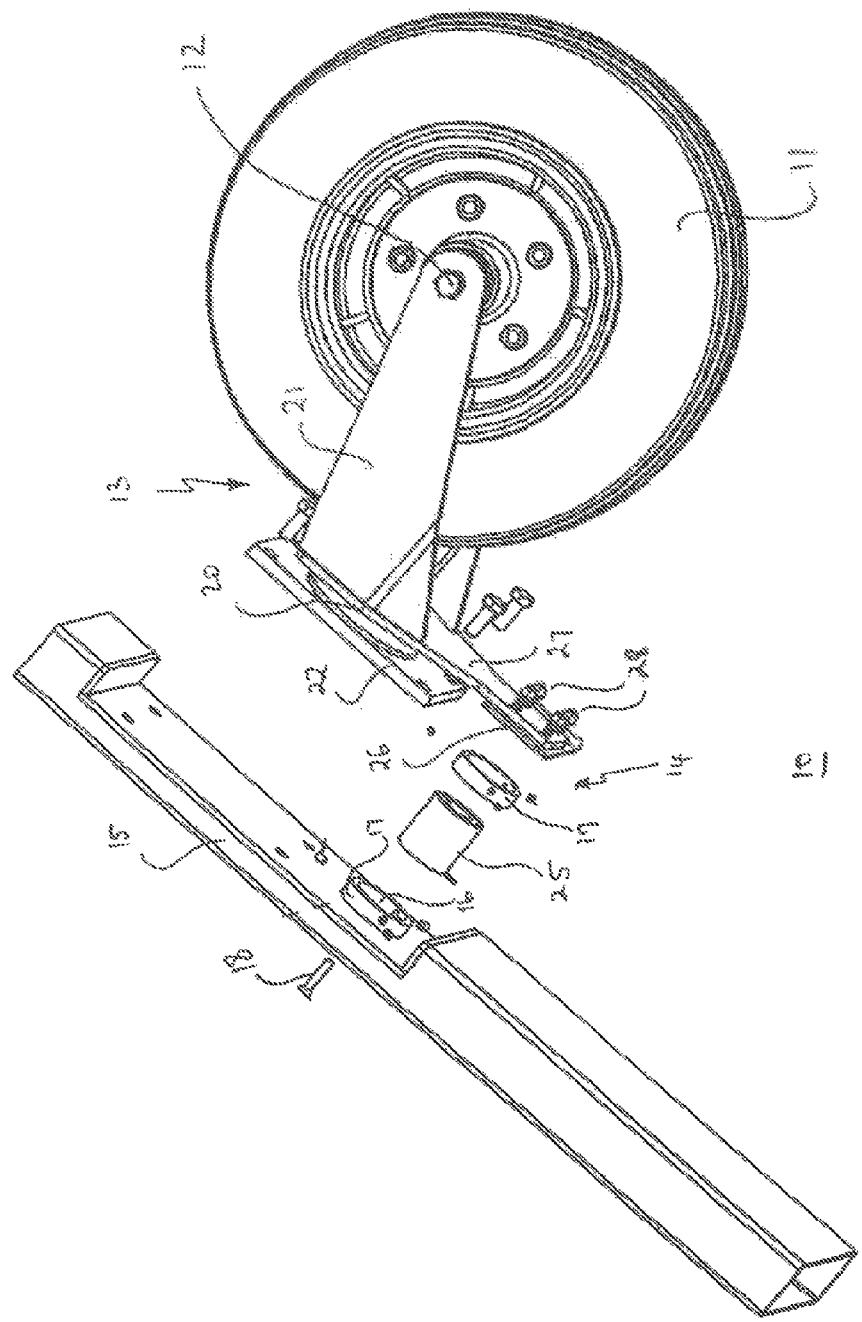
FIG. 1A is an exploded perspective view of a variation of the castor wheel according to FIG. 1.

Referring firstly to FIGS. 1 and 1A, a castor wheel 10 for a vehicle or an attachment for a vehicle according to embodiments of the present disclosure is shown. The castor wheel 10 comprises a wheel 11, the wheel 11 having an axle 12 about which the wheel 11 can rotate. The castor wheel 10 also comprises an offset pivot mounting 13 for mounting the castor wheel 10 to the vehicle or vehicle attachment. The pivot mounting 13 defines a pivot axis A-A, which is perpendicular to and offset from the wheel axle 12. The wheel 11 pivots about the pivot axis A-A.

The castor wheel 10 also comprises a restrainer 14 for restraining the pivoting of the wheel 11 about the pivot axis A-A. Thus, the restrainer 14 partially, but not completely, restricts the pivoting of the wheel 11. This enables the castor wheel 10 to be used in high speed applications, where ordinarily a conventional castor wheel suffers from the previously mentioned vibration problems, by restraining or dampening the vibrations of the wheel 11 in the pivoting direction. The speed at which the castor wheel 10 may travel, without suffering from these vibration problems, is greater than 10 km/hr and can be up to 100 km/hr or more. Importantly, the restrainer 14 does not completely prevent pivoting of the wheel 11. Some freedom of movement for the wheel 11 is required to enable it to pivot with the turning of the vehicle or vehicle attachment to which the castor wheel 10 is mounted.

As shown in particular in FIG. 1, the restrainer 14 is offset from the pivot axis A-A, as indicated by the distance X. This provides the restrainer 14 with a restraint leverage in restraining the pivoting of the wheel 11 about the pivot axis A-A. Thus, the restrainer 14 is required to provide only a relatively small restraining force. If distance X is reduced, then the restraint leverage is reduced and the restraining force which needs to be provided by the restrainer 14 to effectively restrain the pivoting of the wheel 11 is increased.

The pivot mounting 13 comprises a bearing 20, mounting arms 21 and a mounting plate 22. The bearing 20 is what defines the pivot axis A-A and enables the pivoting of the wheel 11. The mounting arms 21 are located on one side of the bearing 20 and connect the bearing 20 to the wheel axle 12, on both sides of the wheel 11. The mounting plate 22 is located on the other side of the bearing 20 to the mounting arms 21 and in the embodiment shown in FIG. 1 is for attaching the castor wheel 10 to the vehicle or vehicle attachment.

In the embodiment shown in FIG. 1A, the pivot mounting 13 also comprises a chassis in the form of a rail 15. In this embodiment, the mounting plate 22 of the pivot mounting 13 connects to the rail chassis 15.

In the embodiments shown in FIGS. 1 and 1A, the restrainer 14 is an electromagnetic restrainer, comprising an electromagnet 25, a contact plate 26 and a connecting member 27. The electromagnet 25 is arranged relative to the contact plate 26 so that, in use, it imparts an attractive force on the contact plate 26 towards the electromagnet 25. Thus, the contact plate 26 must be formed of a material which will be affected by a magnetic field. The attractive force imparted by the electromagnet 25 on the contact plate 26 provides the restraining force which restrains the pivoting of the wheel 11. The connecting member 27 connects the contact plate 26 to the pivot mounting 13, specifically to the mounting arms 21 of the pivot mounting 13. In FIG. 1, the electromagnet 25 is mounted to the vehicle or vehicle attachment.

However, in FIG. 1, the electromagnet 25 is mounted to the rail chassis 15. More specifically, the electromagnet 25 in FIG. 1A is received in a recess 16 formed by a ring 17 on the underside of the rail chassis 15. The recess 16 has the same inner cross-sectional shape as the cross-sectional shape of the electromagnet 25 so that the electromagnet can fit snugly therein. Screws or pins inserted through the side of the recess ring 17 and perpendicular to the electromagnet 25 retain the electromagnet 25 in the recess 16. The electromagnet 25 extends from the underside of the rail chassis 15. The restrainer 14 comprises an adjustor in the form of a threaded bolt 18 for adjusting the extent to which the electromagnet 25 extends from the rail chassis 15. The threaded bolt adjustor 18 is received in the electromagnet 25 through the rail chassis 15 from the opposing side of the rail chassis 15 from which the electromagnet 25 extends. By rotating the threaded bolt adjustor 18, the electromagnet 25 can be moved out from or brought further into the recess 16 thus allowing for adjustment of its position relative to the contact plate 26 thus enabling ready adjustment of the relative position of the electromagnet 25 to the contact plate 26 to allow for any minor variations which might exist between different castor wheels.

In the embodiment shown in FIG. 1A, the restrainer 14 also comprises a spacer in the form of a ring 19 for spacing apart the contact plate 26 and the electromagnet 25 so that they do not wear on each other as they restrain pivoting of the wheel 11. The spacer ring 19 is attached to the end of the electromagnet 25 opposite to that received in the recess 16 and projects therefrom towards the contact plate 26. The spacer ring 19 is retained on the electromagnet 25 by screws or pins inserted through the side of the spacer ring 19 and perpendicular to the electromagnet 25. The spacer ring 19 may engage the contact plate 26 but is formed of a softer material than the contact plate 26 such as aluminium, aluminium alloy or a polymer so that the spacer ring 19 wears preferentially to the contact plate 26. In an alternative arrangement not shown in the figures, the spacer may comprise a thin fibre shim provided between the contact plate and the electromagnet.

In another variation to the embodiments shown in FIGS. 1 and 1A, the contact plate may comprise a circular ring, extending around the pivot mounting to allow for 360° pivoting of the wheel. In this embodiment, the restrainer may comprise a number of connecting members to connect the contact plate to the pivot mounting. Alternatively, the contact plate may comprise only a portion of a ring, where pivoting of the wheel is limited. Generally, however, the contact plate 26 is wider than the width of the electromagnet 25, to allow for some sliding of the contact plate 26 relative to the electromagnet 25 as the wheel 11 pivots about the pivot axis A-A.

The power source for the electromagnet may be provided by a battery, or may be provided from the vehicle or vehicle attachment to which the castor wheel 10 is mounted.

In some instances, it may be desirable to switch the electromagnet 25 off and allow the wheel 11 to pivot freely. This is particularly the case where the vehicle or vehicle attachment is making a sharp turn at low speed (where vibration is not a significant problem) and the wheel 11 is therefore required to pivot significantly at a relatively fast rate. Control of the electromagnet 25 may be provided manually (with or without a remote control) or automatically, whereby the electromagnet switches off when a sensor detects that the vehicle or vehicle attachment is travelling at a certain low speed.

During such substantial pivoting of the wheel 11, the contact plate 26 may move such that it is no longer vertically below the electromagnet 25. Because this will generally only occur at low speeds, it is highly unlikely that when this vertical misalignment of the contact plate 26 and the electromagnet 25 occurs that vibrational problems will arise. However, another problem may occur when the wheel 11 further pivots and brings the contact plate 26 back towards vertical alignment with the electromagnet 25. This problem is that the electromagnetic forces imparted by the electromagnet 25 on the contact plate 26 may have caused some deformation of the contact plate 26 such that the contact plate 26 butts against the side of the electromagnet 25 when pivoting of the wheel 11 moves the contact plate 26 back towards vertical alignment with the electromagnet 25. If this occurs, then normal operation of the castor wheel 10 will be prevented. To mitigate this problem, the contact plate 26 (as shown in FIG. 1A) is biased vertically away from the electromagnet 25 by spring loaded bolts 28 which connect the contact plate 25 to the connecting member 27. This ensures that a vertical clearance is provided between the contact plate 26 and the electromagnet 25 when the contact plate is not under the magnetic influence of the electromagnet 25 (such as when the electromagnet 25 is switched off and/or vertically misaligned). Furthermore, the contact plate 26 (as shown in FIG. 1A) had side edges 29 which are turned and/or tapered away from the electromagnet 25. These turned and/or tapered side edges 29 will aid in deflecting the contact plate 26 under the electromagnet 25 as it moves into vertical alignment should a vertical clearance between the electromagnet 25 and the contact plate 26 not be maintained.

It is to be appreciated that the restrainer 14 may comprise other mechanisms for restraining the pivoting of the wheel 11. Generally, the restrainer 14 comprises a first element connected to the pivot mounting 13 and a second element connected to the vehicle or vehicle attachment or to the chassis of the pivot mounting. The first and second elements interact to produce a restraining force on the pivoting of the wheel 11. In the embodiments shown in FIGS. 1 and 1A, the first element comprises the contact plate 26 and the second element comprises the electromagnet 25.

In another embodiment, the second element could comprise a permanent magnet. However, an electromagnet is preferable because it can be switched on and off.

In another variation, the second element could comprise a brake caliper (i.e. a disc brake) which can contact both sides of the contact plate to restrain pivoting of the wheel 11. In this embodiment, the clamping force of the brake caliper provides the restraining force. In other variations, the second element may comprise a hydraulic brake or a compressed air brake.

Referring now to FIG. 2, a castor wheel 110 according to another embodiment of the present disclosure is shown. Features of the castor wheel 110 which are similar to the castor wheel 10 shown in FIG. 1 or 1A have been given the same reference number, but prefixed with the numeral 1.

The castor wheel 110 also comprises wheel suspension apparatus 130 for providing vertical suspension of the wheel 111. The suspension apparatus 130 comprises at least one, preferably two, spring(s) 131 and two suspension members 132, located on either side of the wheel 111. Each of the two suspension members 132 are connected towards one end to the wheel axle 12 and towards the other end to the spring(s) 131. The mounting arms 121 of the pivot mounting 113 are connected to mid-points of respective suspension members 132 rather than to the wheel axle 112 (as with the castor wheel 10 of FIGS. 1 and 1A). The pivot mounting 113 of FIG. 2 also comprises a U-shaped flange 123, which connects the mounting arms 121 together and to which the spring(s) 131 of the suspension apparatus 130 is connected.

Referring now to FIGS. 3A to 3E, a wheelchair trailer 40 according to an embodiment of the present disclosure is shown. The wheelchair trailer 40 is for carrying a wheelchair, in particular a non-collapsible wheelchair such as a motor driven wheelchair. The wheelchair trailer 40 may be attached to any suitable vehicle, and is particularly suitable for attachment to cars. Thus, the wheelchair trailer 40 enables a car, which ordinarily could not transport non-collapsible wheelchairs to do so.

The wheelchair trailer 40 comprises a base 41 for carrying the wheelchair, a ramp 42 for getting the wheelchair on and off the base 41, and at least one castor wheel 10,110 as shown in FIG. 1, 1A or 2 connected to the base 41 and supporting the base 41 above the ground. The base 41 and ramp 42 are shown formed from a metal mesh or screen, however, they may be formed from any other suitable material, such as a plastic material (for example polyurethane) which provides a surface on which the wheelchair can be supported. The ramp 42 comprises at least two ramp portions 43 joined together by a joining hinge 44 which enables the ramp portions 43 to be moved between an extended position (FIG. 3A) and a folded position (FIG. 3E). The joining hinge 44 is a single sided hinge which is arranged so that when a wheelchair is on the ramp 42, the ramp portions 43 cannot undesirably collapse towards the folded position.

The ramp 42 also has a base connecting hinge 45 at the end of the ramp 42 which connects to the base 41. The base connecting hinge 45 enables the ramp to be moved between an upright position and a lowered position. The base connecting hinge 45 also provides a surface across the join between the base 41 and the ramp 42. The base connecting hinge 45 may be temporarily connected to the base 41. In the embodiment shown in FIG. 3A, the base connecting hinge 45 has spigots 46 projecting from one side of the hinge 45 for engaging the base 41 by insertion through the mesh. The spigots 46 and hence the ramp 42 may be readily removed from their engagement with the base 41. Thus, after a wheelchair has been moved onto the base 41, the ramp 42 may be removed. Similarly, the spigots 46 are readily engaged with the base 41 when it is required to engage the ramp 42 to the base 41 to move the wheelchair off the wheelchair trailer 40.

However, in other embodiments, the ramp 42 may be permanently connected to the base 41. In this embodiment, once a wheelchair has been moved onto the base 41, the ramp 42 may be moved into the folded upright position using first and base connecting hinges 44, 45. In the folded upright position, the ramp 42 helps retain the wheelchair on the wheelchair trailer 40. To subsequently move the wheelchair off the wheelchair trailer 40, the ramp 42 can be moved into the lowered extended position using first and base connecting hinges 44, 45 as shown in FIG. 3A.

The ramp 42 also comprises at least one handle 47 on each of the ramp portions 43 for facilitating ease of handling of the ramp 42, in particular when moving the ramp between the folded upright position and lowered extended position.

The base 41 of the wheelchair trailer 40 comprises a channel 48 for connecting the castor wheel 10, 110 to the wheelchair trailer 40. The channel 48 has internal flanges 49, which may or may not extend the length of the channel 48. The castor wheel is connected to the base 41 by positioning the mounting plate 22, 122 of the pivot mounting 13, 113 in the channel 48 and connecting the mounting plate 22, 122 to the flanges 49.

The base 41 of the wheelchair trailer 40 is also provided with end walls 50 and a side wall 51 for aiding in retaining a wheelchair on the trailer 40. Typically, the wheelchair, when position on the trailer 40 will also be tied or strapped to the trailer 40 so as to retain it on the trailer 40.

Referring also to FIGS. 1, 1A and 2, the electromagnet 25, 125 of the castor wheel 10, 110 used for the wheelchair trailer 40 has a breakaway capacity of approximately 34 kg. The electromagnet 25, 125 is offset from the pivot axis A-A of the castor wheel (i.e. distance X) by approximately 6 inches. These parameters provide a sufficient restraining force on the pivoting of the wheel 11, 111 of the castor wheel 10, 110 to enable a vehicle to which the wheelchair trailer 40 is attached to travel at 100 km/hr or more without the castor wheel 10, 110 suffering from the vibration problems which affect conventional castor wheels. It is noted that these parameters may be varied so as to provide a sufficient restraining force on the rotation of the wheel 11, 111 of the castor wheel 10, 110, by for example having an electromagnet of greater breakaway capacity for a smaller offset distance X or an electromagnet of reduced breakaway capacity for a larger offset distance X. Thus, for the castor wheel 10, 110 mounted to the wheelchair trailer 40, the electromagnet may have a breakaway capacity of 20-100 kg, and an offset distance X of 5-40 cm. Electromagnets of greater breakaway capacity are larger, heavier and are of higher cost, but this design factor must be balanced with having an offset distance which can be reasonably incorporated within the design of the vehicle or vehicle attachment to which the castor wheel 10, 110 is being mounted. It is also to be appreciated that for other applications of the castor wheel 10, 110 according to embodiments of the present disclosure, which require the castor wheel 10, 110 to carry higher or lower loads, that the parameters for the breakaway capacity and the offset distance X may be different. Other such applications include for luggage transportation vehicles at airports.

Figure 4:
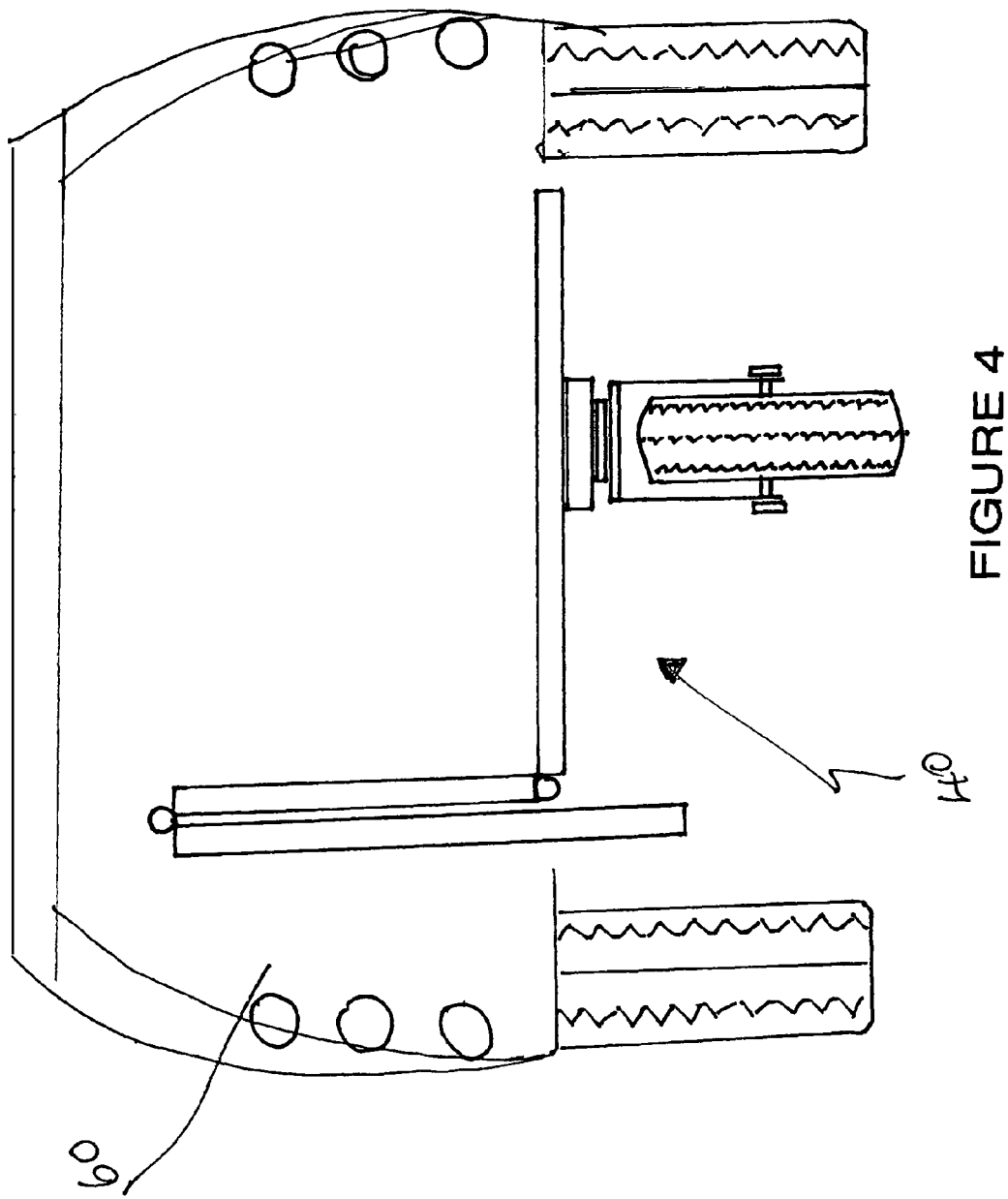
FIG. 4 is a rear view of the wheelchair trailer of FIG. 3A attached to a vehicle, with the ramp in a folded position.
Figure 6:
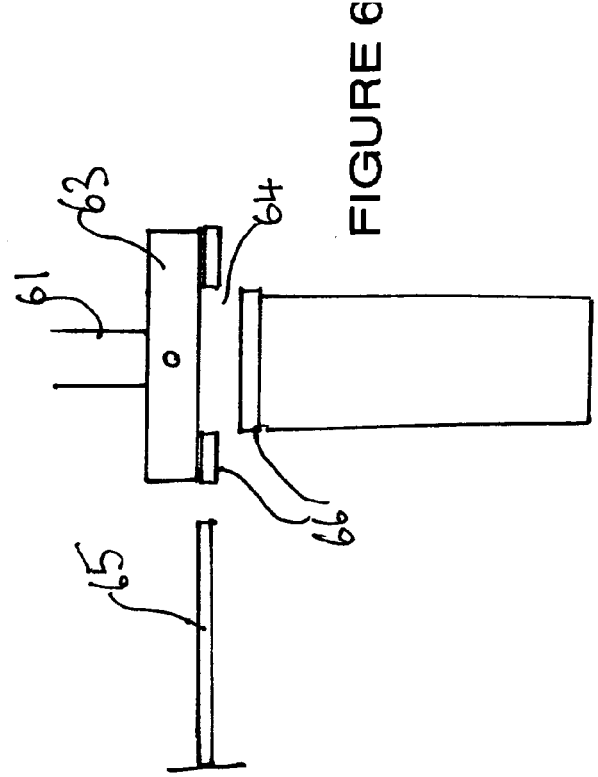
FIG. 6 is a top view of a connecting mechanism for connecting the wheelchair trailer of FIG. 3A to the vehicle.
Figure 5:
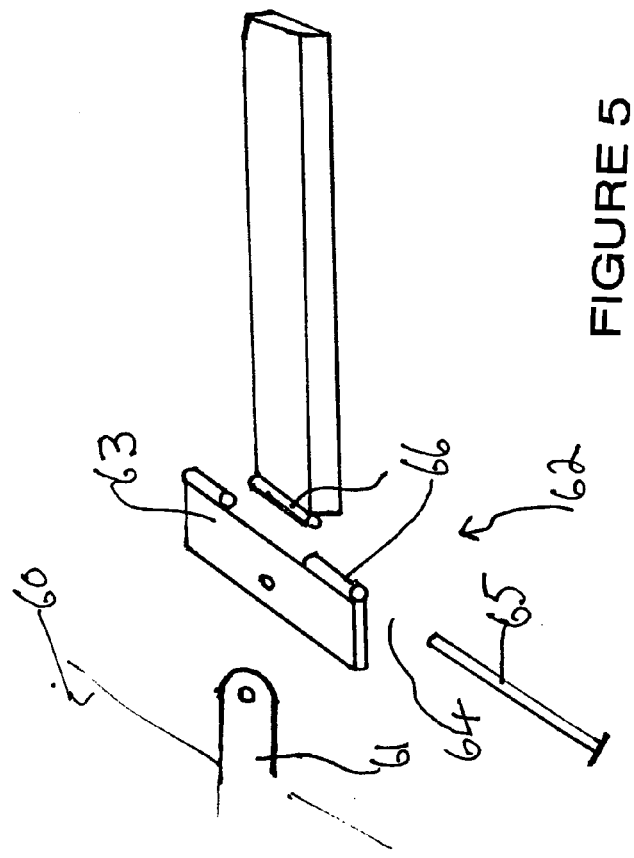
FIG. 5 is an exploded view of the wheelchair trailer of FIG. 3A connected to a vehicle.

Referring now to FIGS. 4 to 6, the wheelchair trailer 40 is shown attached to a vehicle 60, specifically to the towbar 61 of the vehicle 60. The wheelchair trailer 40 comprises a connecting mechanism 62 for connecting the trailer 40 to the towbar 61 without allowing for pivoting of the trailer with respect to the vehicle 60 in the horizontal plane. This is the reason why the wheelchair trailer 40 requires a castor wheel as opposed to a fixed axle wheel.

The connecting mechanism 62 comprises a draw bar 63 which connects directly to the towbar 61 and a hinge 64 for allowing vertical rotation of the wheelchair trailer 40 with respect to the vehicle 60. The hinge 64 comprises a pin 65 which is inserted and fixed through pipes 66 and 67 located on the drawbar 63 and base 41 of the wheelchair trailer 40 respectively.

Figure 7A:
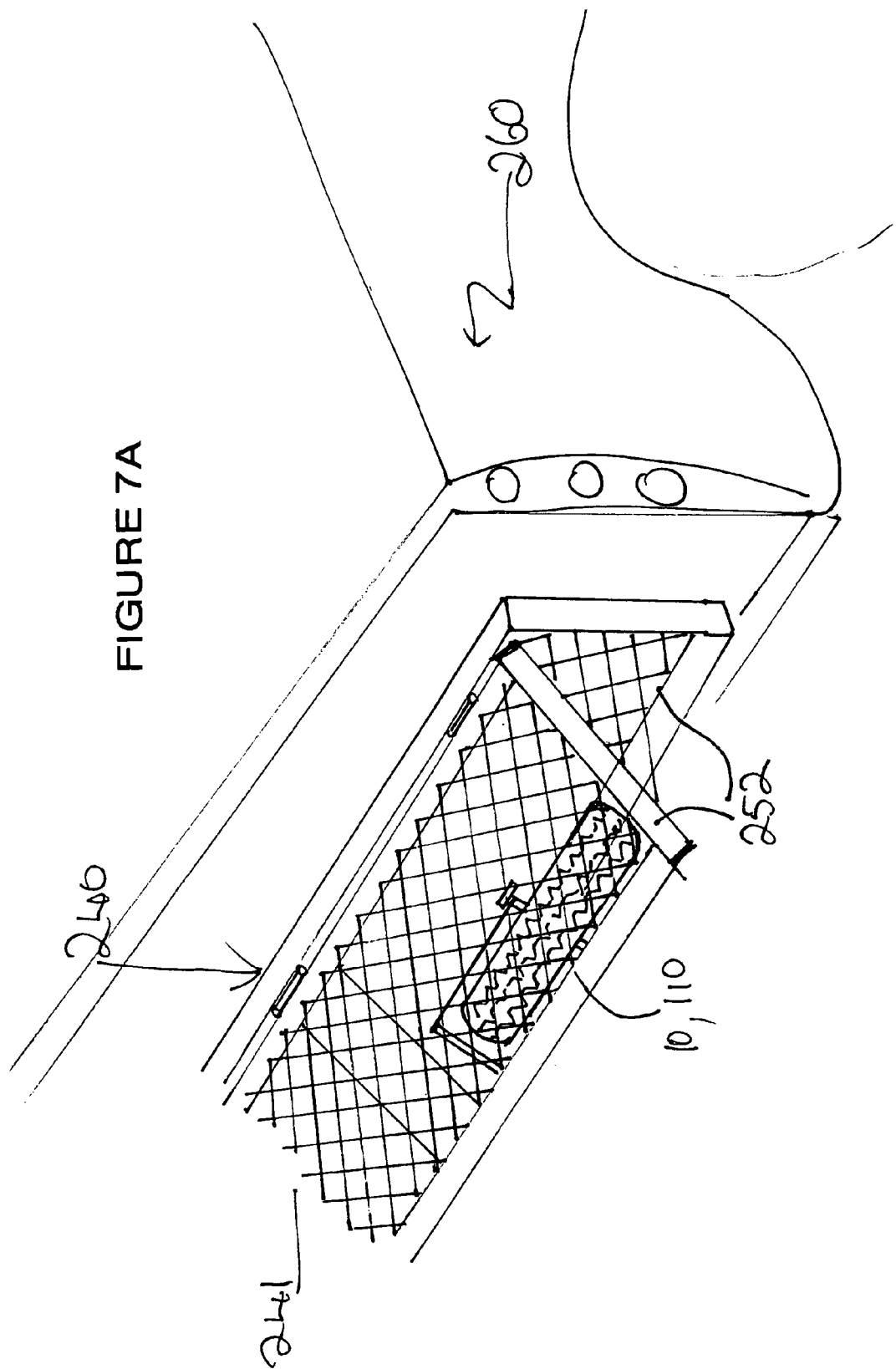
FIG. 7A is an elevated perspective view of another embodiment of a wheelchair trailer according to the present disclosure.
Figure 8:
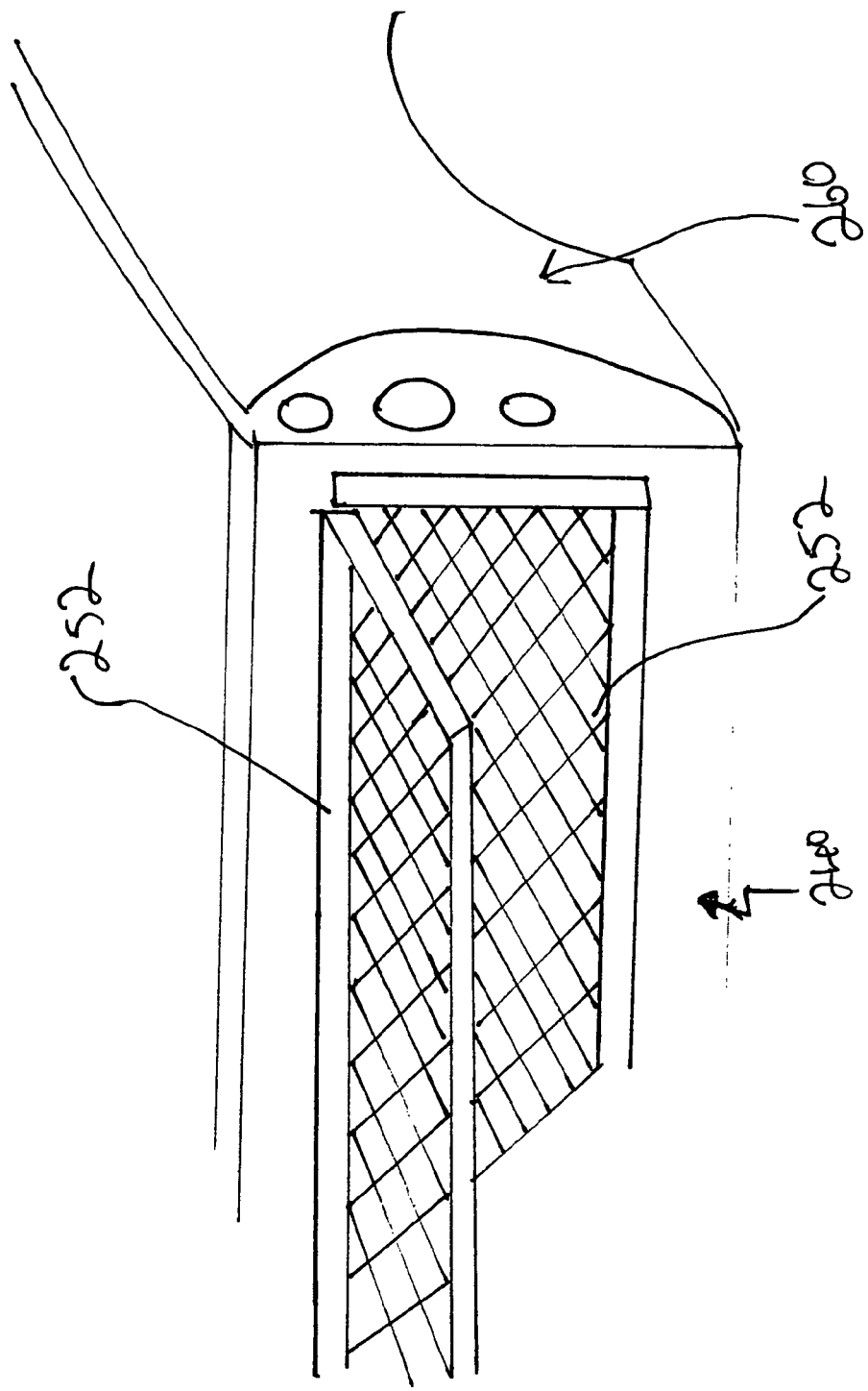
FIG. 8 is a bottom perspective view of the wheelchair trailer of FIG. 7B.

Referring now to FIGS. 7A, 7B and 8, a wheelchair trailer 240 according to another embodiment of the present disclosure is shown. Features of the wheelchair trailer 240 which are similar to the wheelchair trailer shown in FIGS. 3A to 3E have been given the same reference number, but prefixed with the numeral 2.

The base 241 of the wheelchair trailer 240 comprises two base portions 252, joined together by a single sided hinge which allows the base 241 to be folded into a storage position when the wheelchair trailer 240 is not carrying a wheelchair. This means that the wheelchair trailer 240 does not occupy as much space behind the vehicle 260 when not in use. It is noted that the base 241 holds itself in the storage position, with the castor wheel 10, 110 connected to the base portion furthest from the vehicle 260 abutting the other base portion. In this arrangement, the base 241 requires an upward force from a user on the furthest base portion to move the base 241 out of the storage position. The wheelchair trailer 240 may also comprise a winch (not shown) for moving the base 241 into and out of the storage position.

In the embodiment shown in FIGS. 7A, 7B and 8, the ramp (not shown) of the wheelchair trailer 240 is only temporarily attached to the base 241 so as to allow the base 241 to be folded into the storage position.

Figure 9A:
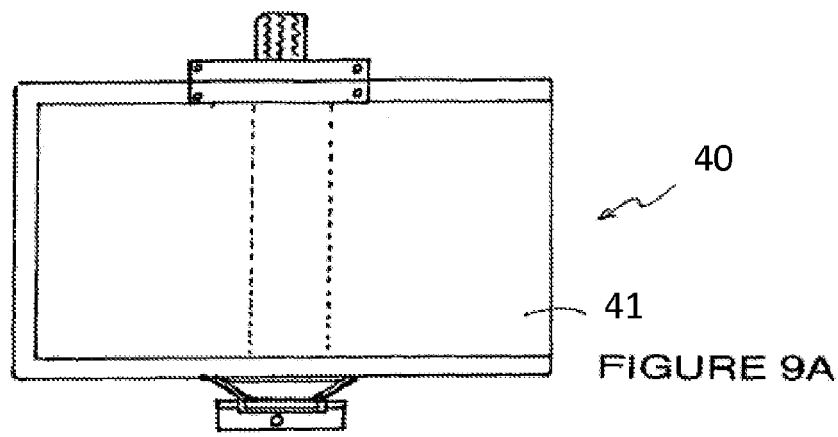
FIGS. 9A, 9B and 9C are top views of different embodiments of a wheelchair trailer according to embodiments of the present disclosure.
Figure 9B:
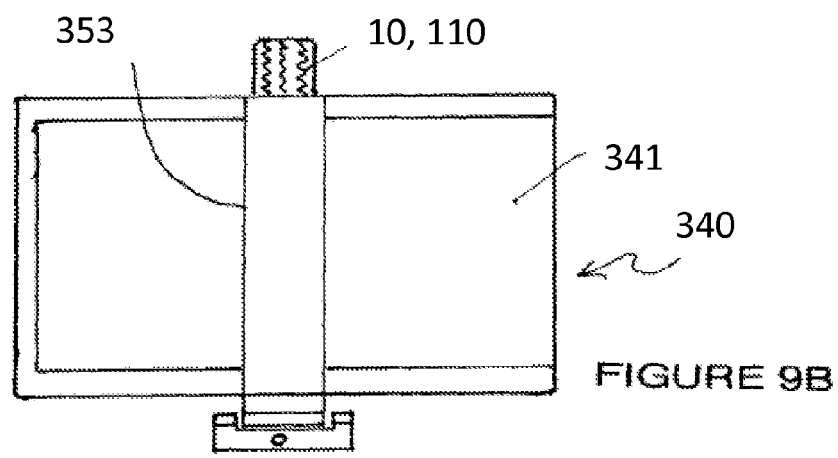
Figure 9C:
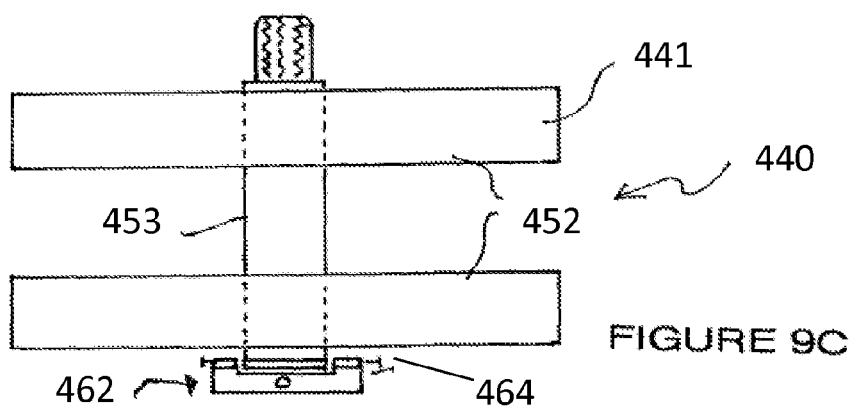

Referring now to FIGS. 9A, 9B and 9C, wheelchair trailers according to different embodiments of the present disclosure are shown. FIG. 9A shows a wheelchair trailer 40 having a base portion 41 as described with reference to FIGS. 3A to 3E above. FIG. 9B shows a wheelchair trailer 340 comprising a mounting member 353 to which the castor wheel 10, 110 of FIG. 1 or 2 is mounted on one side and the base 341 of the trailer 340 is mounted on the opposing side.

FIG. 9C shows a wheelchair trailer 440 comprising a base 441 having two base portions 452 in the form of a pair of skids. The skids 452 have a width slightly greater than the width of the wheels of a wheelchair, for receiving the wheels on either side of the wheelchair respectively. The distance between each of the skids 452 can be adjusted in order to accommodate different wheelchairs on the wheelchair trailer 440. Adjustment of the distance between the skids 452 is achieved by sliding one or both them along the mounting member 453. In addition, when the base 441 is to be moved into the storage position, the base portions 452 in the form of skids can be moved into close proximity with each other and with the vehicle. The mounting member 453 can then be rotated approximately 90° about the hinge 464 of the connecting mechanism 462 into an upright position. This provides for substantially compact storage of the wheelchair trailer 440 when not carrying a wheelchair.

Referring now to FIGS. 10A to 10D, a wheelchair trailer 540 according to another embodiment of the present disclosure is shown. Features of the wheelchair trailer 540 which are similar to the wheelchair trailer shown in FIGS. 3A to 3E have been given the same reference number, but prefixed with the numeral 5.

The wheelchair trailer 540 of FIGS. 10A to 10D also comprises an actuator 570 for moving the ramp 542 as shown sequentially between FIG. 10A to 10D. The actuator 570 comprises a piston rod 571 driven by a magnetic motor (although the piston rod 571 could be driven by any other suitable motor such as a hydraulic, electric or pneumatic motor for example). The actuator 570 has a thrust of up to 4000 N (preferably up to 6000 N, more preferably up to 8000 N). The piston rod 571 has a maximum speed of no more than 70 mm/s (preferably no more than 60 mm/s). A suitable actuator is the LA30 actuator manufactured by Linate®, which has a maximum thrust of 6000 N and a maximum piston speed of 52 mm/s. It is advantageous that the piston rod moves slowly so that movement of the ramp 542 does not occur too quickly, but is stable and controlled. This avoids the ramp 542 catching fingers and/or hitting the base 541, ground or wheelchair at high speed (which could cause damage to the wheelchair or the trailer 540).

The actuator 570 is mounted to the underside of the base 541 and also comprises an arm 572 which connects the piston rod 571 to the ramp 542. The arm 572 comprises first and second portions 573, 574, respectively. The first and second arm portions 573, 574 are rotatably connected to one another by a pivot 575. The first portion 573 is rotatably connected to the piston rod 571 and is substantially linear. The second arm portion 574 is connected to the ramp 542 and is bent.

Figure 10C:
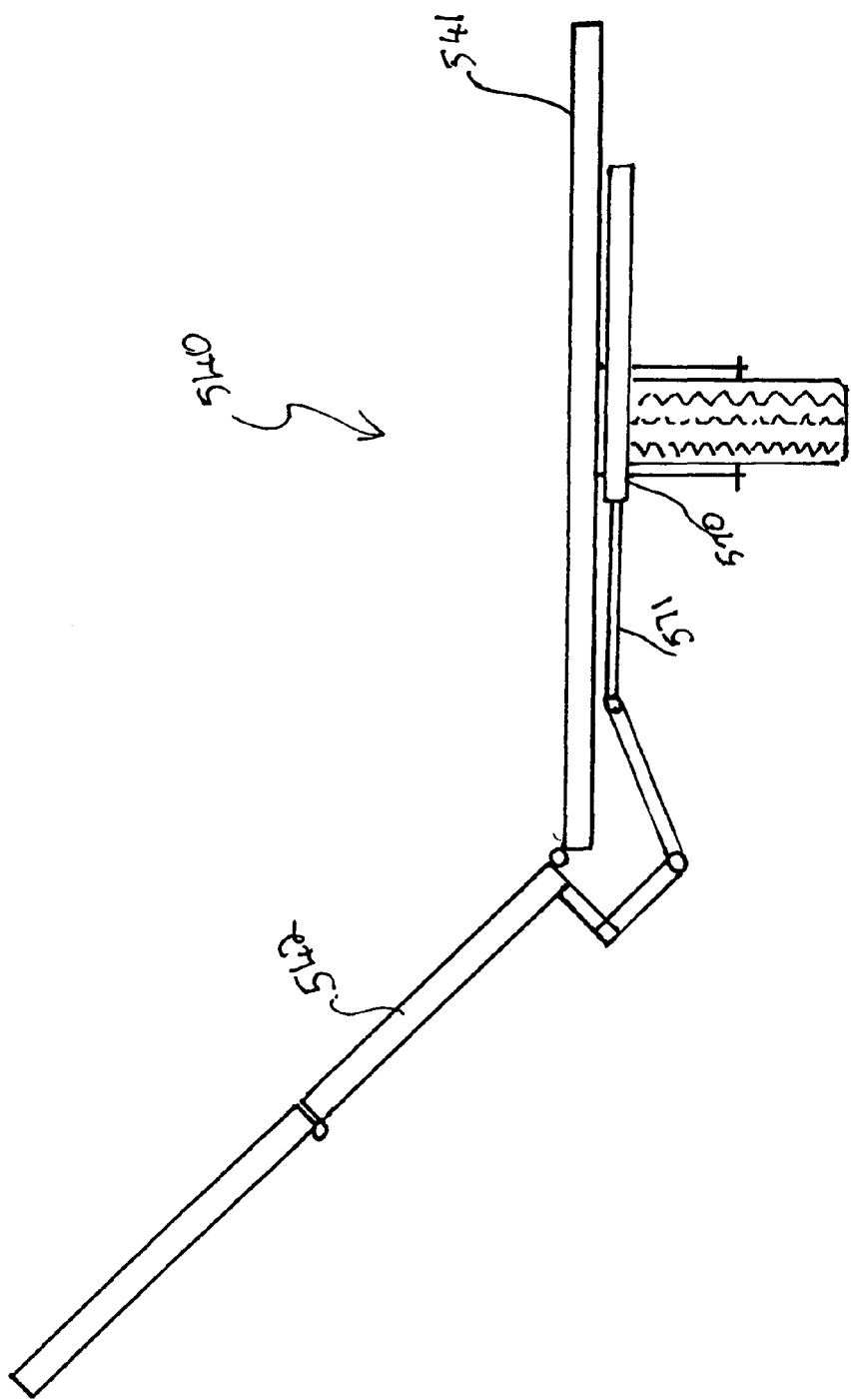

FIGS. 10A to 10D show sequentially the possible movement of the ramp 542 using the actuator. In the embodiment shown in FIGS. 10A to 10D the ramp 542 comprises two ramp portions 543 joined together by the joining hinge 544. In FIG. 10A, the ramp 542 is laid flat on the base 541, which is a useful storage position for the ramp when there is no wheelchair on the wheelchair trailer 540. Retraction of the piston rod 571 of the actuator 570 moves the ramp 542 from its position in FIG. 10A to its position in FIG. 10B where it is upright. This is a suitable position for the ramp 542 when the wheelchair trailer 540 is carrying a wheelchair. Because the first arm portion 573 extends horizontally past the ramp 542 when the ramp 542 is in the upright position, the ramp 542 is substantially stable in this position. Therefore, the ramp 542 is easily retained in the upright position even when the wheelchair trailer 540 is travelling at high speeds. Notably, in the upright position the ramp portions 543 are folded upon themselves about the joining hinge 544.

Figure 10D:
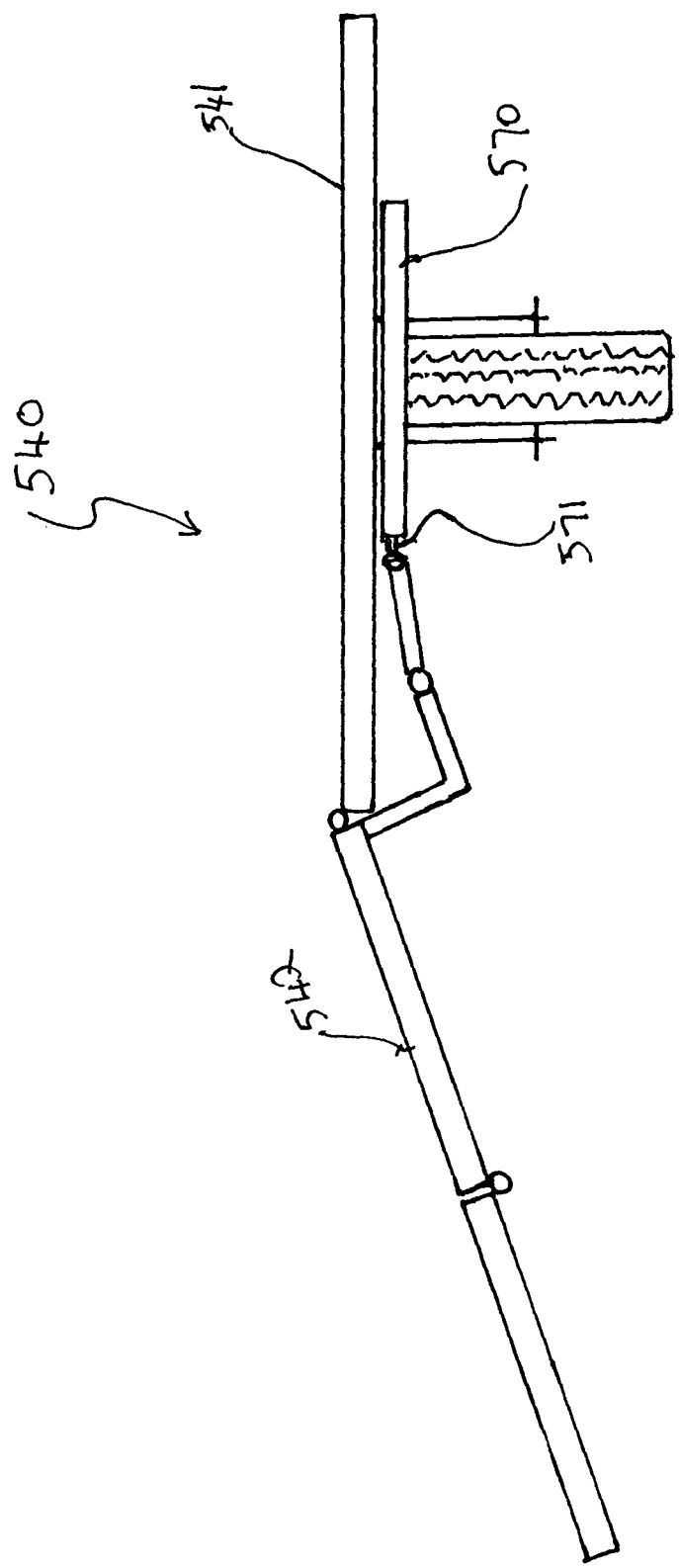

Continued retraction of the piston rod 571 of the actuator 570 moves the ramp 542 from FIG. 10B through FIG. 10C to FIG. 10D. In FIG. 10D, the ramp 542 is in the lowered position resting on the ground to enable the wheelchair to be readily moved onto the base 541 of the wheelchair trailer 540. Movement of the ramp 542 back from the lower position to the upright position and/or the laid flat position occurs in the reverse movement from FIG. 10D through to FIG. 10B or 10A.

It is to be appreciated that whilst description has been provided above of use of the castor wheel 10, 110 according to embodiments in the disclosure with a wheelchair trailer, that the castor wheel 10, 110 could be incorporated into any other suitable vehicle or attachment for a vehicle such as a motorbike trailer or a scooter trailer for example.

In the claim which follows and in the preceding description of the embodiments, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the disclosure.

Unless otherwise indicated, all numerical values used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The terms "a," "an," "the" and similar referents used in the context of describing the invention (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods disclosed herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments of this invention are disclosed herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically disclosed herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Specific embodiments disclosed herein may be further limited in the claims using consisting of or and consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments of the invention so claimed are inherently or expressly described and enabled herein.

In closing, it is to be understood that the embodiments of the invention disclosed herein are illustrative of the principles of the present invention. Other modifications that may be employed are within the scope of the invention. Thus, by way of example, but not of limitation, alternative configurations of the present invention may be utilized in accordance with the teachings herein. Accordingly, the present invention is not limited to that precisely as shown and described.

The invention claimed is:

1. A castor wheel for a vehicle or an attachment for a vehicle, the castor wheel comprising:
   a wheel having an axle about which the wheel can rotate;
   an offset pivot mounting for mounting the wheel to the vehicle or vehicle attachment, wherein the offset pivot mounting is connected to the axle and defines a pivot axis perpendicular to and offset from the axle, wherein the wheel is capable of pivoting about the pivot axis; and
   a restrainer for restraining the pivoting of the wheel, the restrainer comprising a first element and a second element that interact to produce a restraining force on the pivoting of the wheel, wherein the first element comprises a contact plate and the second element is an electromagnet, and the contact plate is wider than the width of the electromagnet and biased vertically away from the electromagnet.

2. A wheelchair trailer for carrying a wheelchair, the wheelchair trailer comprising a base for carrying the wheelchair, a ramp for getting the wheelchair on and off the base, and at least one castor wheel of claim 1.

3. A wheelchair trailer of claim 2, further comprising an actuator for moving the ramp, wherein the actuator comprises a piston rod driven by a hydraulic, an electric, a pneumatic, or a magnetic motor.

4. A wheelchair trailer of claim 3, wherein the actuator has a thrust of up to 8000 N.

5. A wheelchair trailer of claim 3, wherein the piston rod has a maximum speed of no more than 70 mm/s.

6. A wheelchair trailer of claim 2, wherein the ramp comprises at least two ramp portions and a joining hinge, wherein the at least two ramp portions are joined together by the joining hinge, and wherein the joining hinge allows the ramp portions to be moved between an extended position and a folded position.

7. A wheelchair trailer of claim 2, further comprising a hinge connecting the ramp and the base, wherein the hinge is at the end of the ramp, and wherein the hinge can move the ramp to between an upright position and a lowered position.

8. A wheelchair trailer of claim 2, wherein the base comprises two base portions and a single sided hinge, wherein the base portions are joined together by the single sided hinge, and the single sided hinge allows the base portions to be folded into a storage position when the wheelchair trailer is not carrying a wheelchair.

9. A castor wheel of claim 1, wherein the restrainer is offset from the pivot axis such that the distance between the restrainer and the pivot axis is 5-40 centimeters.

10. A castor wheel of claim 1, wherein the offset pivot mounting comprises a bearing for pivoting of the wheel, wherein the pivot axis is defined by the bearing.

11. A castor wheel of claim 1, wherein the electromagnet has a breakaway capacity of 20-100 kg.

12. A castor wheel of claim 1, wherein the electromagnet may be switched on and off.

13. A castor wheel of claim 1, wherein the electromagnet is mounted to the offset pivot mounting and the restrainer further comprises an adjustor for adjusting the extent to which the electromagnet extends from the offset pivot mounting.

14. A castor wheel of claim 1, wherein the restrainer further comprises a spacer for spacing apart the first and second elements.

15. A castor wheel of claim 1, wherein the restrainer further comprises a sensor for sensing the speed of the vehicle or vehicle attachment, whereby the electromagnet is switched off when the sensor detects that the vehicle or vehicle attachment is travelling at a certain low speed.

16. A vehicle comprising at least one castor wheel of claim 1, wherein the vehicle is capable of travelling at a speed in excess of 10 km/hr.

\* \* \* \* \*